United States Patent
Gardner

[15] 3,685,617
[45] Aug. 22, 1972

[54] BEARING AND LUBRICATION MEANS
[72] Inventor: Willis W. Gardner, Waukesha, Wis.
[73] Assignee: Borg-Warner Corporation, Chicago, Ill.
[22] Filed: Jan. 6, 1971
[21] Appl. No.: 104,373

[52] U.S. Cl. ............... 184/6.28, 184/6.3, 184/6.16, 308/168
[51] Int. Cl. ........................ F16n 7/36, F16n 29/02
[58] Field of Search ............. 184/6.1, 6.3, 6.28, 6.16; 308/168, 86

[56] References Cited

UNITED STATES PATENTS

| | | |
|---|---|---|
| 3,575,264 | 4/1971 | Johnson et al. ............... 184/6 |
| 2,691,556 | 10/1954 | Lakey ........................ 308/168 |
| 2,953,416 | 9/1960 | Collins et al. ........... 308/168 X |
| 3,390,926 | 7/1968 | Wollerweber, Jr. ... 308/168 X |
| 2,711,934 | 6/1955 | Rickenmann ................ 308/9 |
| 2,715,367 | 8/1955 | Kodet et al. .............. 417/365 |

Primary Examiner—Manuel A. Antonakas
Attorney—Donald W. Banner, William S. McCurry and John W. Butcher

[57] ABSTRACT

A bearing lubrication system used to lubricate and cool the thrust and journal bearings of a shaft of a rotating machine, such as, for example, a centrifugal compressor. The system incorporates a shaft mounted centrifugal pump discharging lubricating fluid directly into a chamber sealed by a thrust and a journal bearing.

9 Claims, 1 Drawing Figure

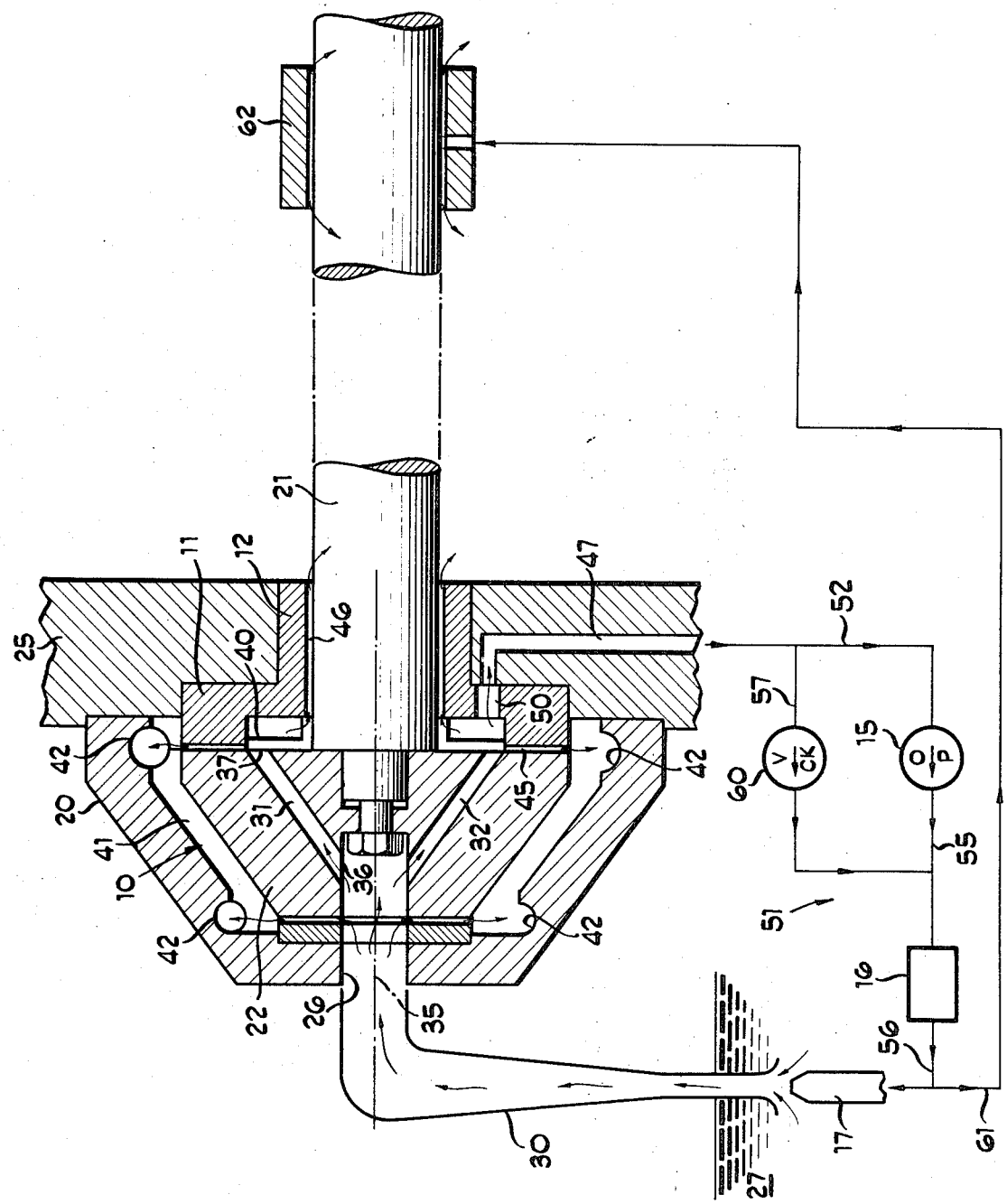

BEARING AND LUBRICATION MEANS

SUMMARY OF THE INVENTION

This invention relates to bearing lubrication systems and more particularly to a system for lubricating the shaft bearings of a rotary machine.

Various approaches have been used in the past to provide fluid for the lubrication and cooling of the thrust and journal bearings normally associated with the shaft of a rotating machine such as a centrifugal compressor. The most common approaches have generally incorporated a rotary pump of the centrifugal or impeller type fixed to the rotary shaft. The pump at its inlet is in communication with a fluid source and, when the shaft is in motion, the pump generates fluid pressure to supply the bearings with lubricating fluid through a system of fluid conduits. Generally, such an arrangement has required the use of a volute seal positioned in the pump housing between high and low pressure zones.

An inherent disadvantage in most prior art systems is the power dissipated through what is commonly termed "churning losses." Such losses result from the rotary pump discharging fluid under pressure into a chamber arranged such that the fluid under pressure remains in contact with the outer periphery of the rotating pumping member.

A second problem frequently encountered in such systems is the lack of availability of any pressurized fluid for bearing lubrication purposes upon start-up of the rotary machine. It is apparent that no fluid can be pressurized or circulated through the system until the pump has been brought up to speed. As a result, there is a time interval between start-up and the time the pump has pressurized sufficient fluid to circulate to the bearings when the shaft is rotating and the bearing surfaces are co-acting without lubricating fluid.

The present invention is an improvement over prior art systems and eliminates entirely the need for a volute seal since it uses the thrust bearing and journal bearing to seal the chamber into which the centrifugal pump discharges.

Further, the centrifugal pump discharges into a chamber which is not under pressure and vent drained. This arrangement eliminates "churning losses" since the chamber around the impeller is dry and is adequately vented to the fluid sump to drain away any lubricating fluid which would pass into this chamber from the discharge chamber.

Means are also provided to circulate fluid through the system irrespective of the rotation or non-rotation of the centrifugal pump. Thus, fluid can be circulated through the system prior to start-up, thus, assuring that sufficient lubricating fluid will be present at the bearing surfaces upon start-up of the rotary machines.

BRIEF DESCRIPTION OF THE DRAWINGS

FIG. 1 is a view partially in schematic of a bearing lubrication system incorporating the principles of the present invention.

DESCRIPTION OF THE PREFERRED EMBODIMENTS

Referring to FIG. 1 a bearing lubrication system is shown which includes as its primary elements a centrifugal pump 10, a thrust bearing 11, a journal bearing 12, an auxiliary fluid pump 15, a combination filter and cooler 16 and a jet pump 17.

The centrifugal pump 10 includes a pump housing 20, a rotatable shaft 21 which is connected to a rotary machine not shown and a rotary member 22 drivingly connected to the shaft 21. The pump housing 20 is shown connected to a machine frame 25. The pump housing includes a fluid inlet 26 defined in the housing 20 which is in communication with a fluid source 27 which will generally be referred to as the sump. A fluid conduit 30 connects the fluid source 27 and the fluid inlet 26.

The rotary member 22 includes passage means 31 and 32 defined in the rotary member and inclined at an angle to a central axis 35 of the shaft 21. The passages 31 and 32 each include an inlet end 36 and an outlet end 37. The inlet end 36 is in fluid communication with the fluid inlet 26. Two passages 31 and 32 are shown here but any convenient number of passages may be used.

The thrust bearing 11 is shown disposed between the machine frame 25 and the rotary member 22. The journal bearing 12 is shown disposed between the shaft 21 and the machine frame 25. The thrust and journal bearings can either be formed as an integral unit as shown in FIG. 1 or as separate bearing members.

A first fluid chamber 40 is shown defined by the thrust bearing 11, the journal bearing 12, the shaft 21 and the back edge of the rotary member 22. The chamber 40 is annular in configuration and is in communication with the outlet ends 37 of the passages 31 and 32. A second fluid chamber 41 is shown defined between the outer periphery of the rotary member 22 and the inner periphery of the pump housing 20. This chamber surrounds the rotary member 22. Oil discharge holes 42 or vent means are shown formed in the pump housing 20 and serve to communicate any fluid in the chamber 41 to the fluid sump 27.

The thrust bearing 11 defines at least one groove 45 which serves as a restricted orifice to communicate fluid from the chamber 40 to lubricate the face of the thrust bearing 11. The journal bearing 12 defines at least one groove 46 which serves as a restricted orifice to carry fluid from the chamber 40 to lubricate the face of the journal bearing 12.

A fluid exit conduit 47 is shown defined in the machine frame 25 and a fluid exit port 50 is shown defined in the thrust bearing 11 both of which serve to communicate fluid from the chamber 40 to the auxiliary pump 15, to the filter and cooler 16, through the jet pump 17 and to the fluid inlet 26 through a fluid circuit generally referred to as 51.

The fluid circuit 51 includes a conduit 52 connecting the fluid exit conduit 47 and the inlet of auxiliary pump 15, a conduit 55 connecting the outlet of the pump 15 and the inlet of the filter 16, a conduit 56 connecting the outlet of the filter 16 and the jet pump 17 and a conduit 57 connecting the conduits 52 and 55.

A check valve 60 is shown connected in the conduit 57 in fluid communication with the conduit 52, the auxiliary oil pump 15 and the conduit 55. The check valve 60 is normally biased to the closed position so that fluid flowing through the conduit 52 will normally flow to the inlet of the pump 15.

The check valve 60 is set to open at a predetermined fluid pressure and, upon opening, will bypass fluid through conduit 57 around the auxiliary pump 15 to the filter and cooler 16. An additional fluid conduit 61 may be provided to transmit lubricating fluid from the filter and cooler 16 to additional journal bearings 62 which are shown located along the shaft 21.

The operation of the bearing lubrication system of the present invention in summary is as follows:

Prior to rotating the shaft 21, the auxiliary oil pump 15 is started. The pump takes its suction through the centrifugal oil pump 10 and the jet pump 17 from the sump 27 as shown. Discharge pressure from the oil pump 15 helps to bias the check valve 60 to its closed position. Fluid flows from the pump 15 to the filter and cooler 16 through conduit 55 and then to the jet pump 17 through conduit 56. Fluid also flows through the conduit 61 to journal bearings 62.

The jet pump 17 is basically a fluid supplementing means and as fluid passes through the jet pump 17 additional fluid is drawn from the sump 27 and is passed to the fluid inlet 26 through conduit 30. The lubricating fluid flows through passage means 31 and 32 under pressure to the chamber 40 and through groove 45 in thrust bearing 11 and groove 46 in journal bearing 12. Any fluid which passes into the secondary chamber 41 is drained to the fluid sump 27 by means of oil passages or vent means 42.

With oil supplied to the bearings, the rotary machine may then be activated and the shaft 21 rotated. The oil flow path is still the same as the shaft speed is increased, but the oil pressure and flow rate are increased by the action of the centrifugal pump 10. Fluid enters the inlet ends 36 of the passage means 31 and 32 and, through centrifugal action, is discharged from the outlet ends 37 at a higher pressure. Fluid discharged from the outlet ends 37 flows into the chamber 40 as previously described. When the flow from the centrifugal pump 10 to the inlet side of the auxiliary pump 15 exceeds the output of the auxiliary pump, the check valve 60 opens and allows the additional flow to follow a parallel path through conduit 57. At this time, the auxiliary pump 15 can then be shut off manually or it may be connected to automatically shut off upon opening of the check valve 60.

It can thus be seen that a bearing lubrication system has been provided in which the lubricating fluid is discharged into a cavity sealed by the thrust and journal bearings. This system provides a dry chamber which surrounds the rotary member of the centrifugal pump. Such a system eliminates power losses associated with high speed churning of the oil and eliminates the need for a volute seal. The system also provides adequate flow of lubricating oil through both the shaft and journal bearings to provide for lubrication and cooling. The flow through the bearings can be limited by proper sizing of the grooves and orifice holes to allow pressure build-up by the centrifugal pump yet permit adequate flow through the bearings for lubrication and cooling. The pressure developed at the discharge of the centrifugal pump is also used to provide hydrostatic thrust bearing action to partially balance the thrust load, the remainder of the load being carried hydrodynamically by the thrust bearing.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A bearing lubrication system including: pumping means comprising a housing, a shaft including a central axis and a rotary member driven by said shaft within said housing; passage means defined in said rotary member inclined at an angle to the central axis of said shaft, said passage means including an inlet end in communication with a fluid source and an outlet end whereby upon rotation of said rotary member fluid is conducted from said inlet end to said outlet end by centrifugal force; a fluid inlet defined in said housing adapted to communicate fluid from said fluid source to said passage means; a first chamber in communication with the outlet end of said passage means adapted to receive fluid from said passage means; a second chamber defined between the outer periphery of said rotary member and said pump housing in fluid communication with said first chamber and vented to a fluid sump to prevent pressure or liquid build-up in said chamber; thrust bearing means associated with said rotary member and in fluid communication with said first chamber and journal bearing means associated with said shaft and in fluid communication with said first chamber.

2. A bearing lubrication system as in claim 1 including a fluid circuit connecting said first fluid chamber and said fluid inlet.

3. A bearing lubrication system as in claim 2 including auxiliary pumping means connected in said fluid circuit to receive fluid from said first chamber and to supply fluid under pressure to said fluid inlet and thereafter through said system irrespective of the rotation or non-rotation of said rotary member.

4. A bearing lubrication system as in claim 3 including fluid supplementing means in communication with said fluid inlet and said fluid source operative upon activation of said auxiliary pumping means to add fluid in the fluid circuit to increase the supply of fluid to said inlet ends.

5. A bearing lubrication system as in claim 3 including valve means connected in said fluid circuit such that said valve means is normally biased to ensure fluid flow from said first fluid chamber through said auxiliary pump, but is adapted to open at a predetermined fluid pressure to communicate said first fluid chamber with said fluid inlet, bypassing said auxiliary pumping means.

6. A bearing lubrication system as in claim 1 in which said first chamber is defined by said thrust bearing means, said journal bearing means, said shaft and said rotary member.

7. A bearing lubrication system as in claim 1 including a restricted fluid passage in communication with said first chamber defined between said journal bearing and said shaft to communicate fluid from said chamber to lubricate said bearing.

8. A bearing lubrication system as in claim 1 including a restricted fluid passage in communication with said first chamber defined between said thrust bearing means and said rotary member to communicate fluid from said chamber to lubricate said bearing.

9. A bearing lubrication system as in claim 1 in which said thrust bearing means and journal bearing means are formed as an integral member.

* * * * *